(No Model.)
J. H. BROWN.
Machine for Sawing Kindling Wood.
No. 237,161. Patented Feb. 1, 1881.
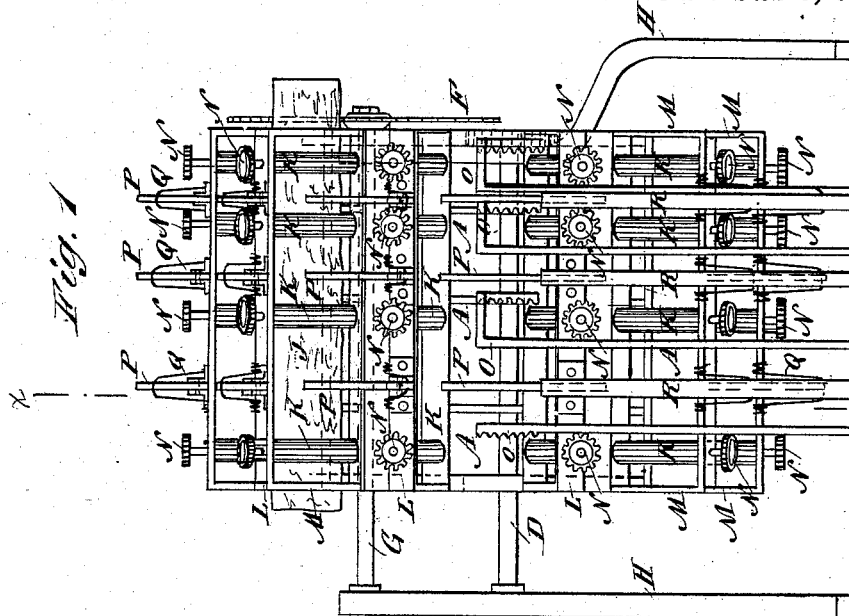
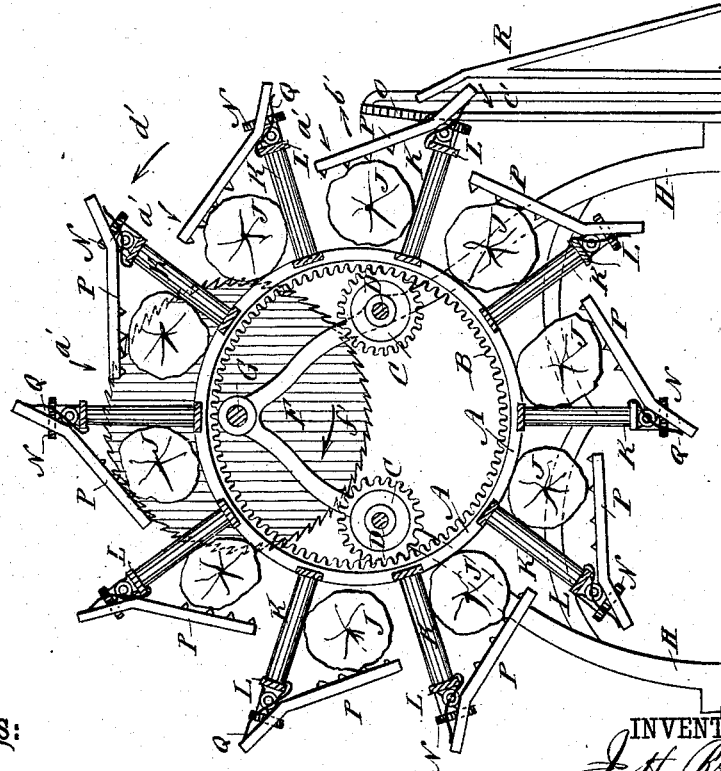
WITNESSES:
C. Neveux
C. Sedgwick
INVENTOR:
J. H. Brown
BY Munn & Co
ATTORNEYS.

UNITED STATES PATENT OFFICE.

JAMES H. BROWN, OF BOSTON, MASSACHUSETTS.

MACHINE FOR SAWING KINDLING-WOOD.

SPECIFICATION forming part of Letters Patent No. 237,161, dated February 1, 1881.

Application filed July 7, 1880. (No model.)

*To all whom it may concern:*

Be it known that I, JAMES HORACE BROWN, of Boston, in the county of Suffolk and State of Massachusetts, have invented a new and Improved Machine for Sawing Kindling-Wood, of which the following is a specification.

The object of my invention is to provide a new and improved machine for sawing kindling-wood, which feeds the logs or sticks to the saw automatically, and is simple in construction and operation.

The invention consists of a cylindrical frame, actuated by internal gearing or shaft, and provided with one or more rows of radial arms consisting of cylinders with roughened surfaces, and having a cog-wheel at the outer end, which cog-wheels engage with a rigid rack when the radial arms are in a horizontal position, whereby the roughened cylinders upon which the log or stick of wood rests are rotated, and the log is moved toward the saw a short distance at right angles to the same, the spring-clamps, which hold the log and are pivoted on a transverse bar connecting the outer ends of the radial arms, having been previously raised by a fixed tripping device.

In the accompanying drawings, Figure 1 is a side elevation of my improved machine for sawing kindling-wood. Fig. 2 is a cross-sectional elevation of the same on the line $x\ x$, Fig. 1.

Similar letters of reference indicate corresponding parts.

The cylindrical frame A is provided with an internal circular rack, B, engaging with the cog-wheels C C, mounted on the shafts D D, provided with pulleys E E, for the application of power. A circular saw, F, is mounted on the end of the shaft G, journaled in the supporting-frame H, and provided with a pulley, I, which shaft is arranged so that the saw cuts off the log or stick J almost flush with the end of the cylindrical frame A. One or more rows of cylinders or rollers K, with fluted, spiked, or otherwise roughened surfaces, are radially pivoted at one end in the cylindrical frame A, and at the other end in a transverse bar, L, fastened to the frame A by the radial end arms, M. A cog-wheel, N, is mounted on the outer end of each roller K, and during the rotations of the frame A engages with a rack, O, which is rigidly held by means of an upright bar or other suitable device. The several rollers K of the longitudinal rows are also arranged in transverse rows, and one rack, O, is provided for each transverse row. A series of bent levers, P, having teeth on the lower side of one end, are pivoted on the bar L, between each two rollers, K K, as shown, and are acted upon by powerful springs Q, which press them in the direction of the arrow $a'$, whereby they hold the log J. A fixed tripping device, R, is arranged between the racks O in such a manner that the short end of each bent lever P successively strikes against it, whereby the spiked or toothed end of the lever P is raised, as indicated by the arrows $b'$ and $c'$. The rollers K and the spring-clamps P are arranged closer to each other at the saw end of the machine, as short pieces must be held at that end, and the strain caused by the saw entering into the logs has more effect upon the clamps at the saw end of the machine.

Instead of a circular saw any other suitable kind of saw may be used.

The operation is as follows: A log or stick of wood, J, is placed upon each longitudinal row of rollers K successively as the said rollers are in a horizontal position, and the logs are held by the spring-clamps P. The frame A is then rotated in the direction of the arrow $d'$, and the saw F in the direction of the arrow $f'$. If during the rotations one longitudinal row of rollers K is approaching the horizontal position, the short ends of the spring-clamps P strike against the tripping devices R, and said clamps are raised, thereby releasing the log, but at the same time the cog-wheels N engage with the racks O, whereby they are rotated, and move the log toward the saw F, in the direction of the length of the machine; but as the frame A continually rotates, the spring-clamps P and the cog-wheels N are disengaged from the rack O and tripping device R, the former being pressed against the log and holding it in its new position—that is, projecting beyond the end of the machine. The projecting end of the log then comes in contact with the saw, and is cut off. In the same manner all the logs are moved forward every time the arms upon which they rest are in a horizontal position. The distance that the logs are to be moved at each rotation of the cylindrical frame may be regulated by means of the rack O or cog-wheels N.

Having thus described my invention, what I claim as new, and desire to secure by Letters Patent, is—

1. A machine for sawing kindling-wood made substantially as herein shown and described, consisting of a saw and a cylindrical rotating frame provided with one or more rows of radial rollers for carrying the logs, one or more rows of spring-clamps for holding the logs, and devices for intermittently rotating the log-supporting rollers and for raising the spring-clamps when the logs are to be pushed forward, as set forth.

2. In a machine for sawing kindling-wood, the combination, with the spring-clamps P and rollers K on rotary frame A, of the tripper R, cog-wheels N, and racks O, operating in quick succession to trip the clamps and actuate the rollers, substantially as described.

JAMES HORACE BROWN.

Witnesses:
HENRY H. SPRAGUE,
SAMUEL S. SHAW.